United States Patent [19]

Duecoffre et al.

[11] Patent Number: 5,739,216
[45] Date of Patent: Apr. 14, 1998

[54] BINDER COMPOSITION, COATING COMPOSITIONS CONTAINING THIS BINDER COMPOSITION, PRODUCTION AND USE THEREOF

[75] Inventors: Volker Duecoffre; Carmen Flosbach; Friedrich Herrmann, all of Wuppertal; Heinz-Walter Reifferscheidt, Bochum; Walter Schubert, Wuppertal, all of Germany

[73] Assignee: Herberts Gesellschaft Mit Beschrankter Haftung, Wuppertal, Germany

[21] Appl. No.: 732,474

[22] PCT Filed: May 3, 1995

[86] PCT No.: PCT/EP95/01663

§ 371 Date: Jan. 2, 1997

§ 102(e) Date: Jan. 2, 1997

[87] PCT Pub. No.: WO95/30719

PCT Pub. Date: Nov. 16, 1995

[30] Foreign Application Priority Data

May 7, 1994 [DE] Germany ............... 44 16 282

[51] Int. Cl.⁶ .................................................. C09D 175/04
[52] U.S. Cl. ................................. 528/438; 525/440
[58] Field of Search ............................. 525/438, 440

[56] References Cited

U.S. PATENT DOCUMENTS

| | | | |
|---|---|---|---|
| 4,371,667 | 2/1983 | Möller | 525/208 |
| 4,501,829 | 2/1985 | Oda | 523/400 |
| 4,851,460 | 7/1989 | Stranghöner | 523/407 |
| 4,902,757 | 2/1990 | Kordomenos et al. | 525/440 |
| 4,981,921 | 1/1991 | Blum | 525/419 |
| 5,252,696 | 10/1993 | Laas | 528/49 |

FOREIGN PATENT DOCUMENTS

| | | |
|---|---|---|
| 0019844 | 12/1980 | European Pat. Off. . |
| 0061628 | 10/1982 | European Pat. Off. . |
| WO8400771 | 3/1984 | European Pat. Off. . |
| 0187379 | 7/1986 | European Pat. Off. . |
| 0310345 | 4/1989 | European Pat. Off. . |
| 0321607 | 6/1989 | European Pat. Off. . |
| 0388927 | 9/1990 | European Pat. Off. . |
| 0540985 | 5/1993 | European Pat. Off. . |
| 2333384 | 1/1977 | Germany . |
| 2924632 | 1/1981 | Germany . |
| 3022996 | 4/1981 | Germany . |
| 3628124 | 3/1988 | Germany . |
| 3800389 | 7/1989 | Germany . |
| 4237658 | 5/1994 | Germany . |
| 4317791 | 12/1994 | Germany . |

OTHER PUBLICATIONS

E. Vollmert–Verlag–Karlsruhe, 1985, Bruno Vollmert, Grundriss Der Makromokekularen Chemie, Band II, Polymersynthesen II, [Polykondensation] Polymer–Reaktionen, pp. 4–20.

Products Finishing, Carl J. Rieger, Metallic–Effect Coatings, Apr. 1976, pp. 54–56.

*Primary Examiner*—Edward J. Cain
*Attorney, Agent, or Firm*—Cushman Darby & Cushman, IP Group of Pillsbury Madison & Sutro LLP

[57] ABSTRACT

Binder composition, coating compositions produced therefrom and use thereof, in particular for multi-layer lacquer coatings. The binder composition contains:

A) 25 to 75 wt. % of the reaction product of one or more carboxy-functionalised (meth) acrylic copolymers containing urethane groups and/or of one or more carboxy-functionalised polyesters containing urethane groups, each having an acid value of 30 to 200 mg of KOH/g, with one or more lactones, B) 25 to 75 wt. % of one or more epoxy-functionalised crosslinking agents having at least two epoxy functions per molecule with a number average molecular weight (Mn) of 200 to 10000 g/mol, C) 0 to 60 wt. % of one or more polyols having at least two hydroxyl functions per molecule, $D_1$) 0 to 20 wt. % of one or more melamine resins, $D_2$) 0 to 40 wt. % of one or more free or capped polyisocyanates, wherein the sum of the weight percentages of components A), B), C), $D_1$) and $D_2$) amounts to 100 wt. %, together with E) 0 to 10 wt. % of one or more catalysts to catalyse the reaction of carboxyl and epoxy groups, relative to the sum of weights of components A) to $D_2$).

18 Claims, No Drawings

BINDER COMPOSITION, COATING COMPOSITIONS CONTAINING THIS BINDER COMPOSITION, PRODUCTION AND USE THEREOF

This invention relates to binder compositions suitable for the production of coating compositions, which are stoved at elevated temperature and are in particular suitable for the production of multi-layer lacquer coatings, for example in the automotive sector.

DE-A-30 22 996 discloses a storing lacquer in which polymers containing carboxyl groups, such as for example acrylates based on acrylic acid or methacrylic acid and acrylates containing glycidyl groups are combined to yield a curable composition.

WO 84/00771 describes a multi-component system in which four types of binder are mixed together and then applied. The components comprise an acrylate containing hydroxyl groups, acid anhydride, wherein at least 50% are alkylhexahydroxphthalic anhydrides, epoxy resin and melamine resin. The systems have an elevated solids content.

DE-A-23 33 384 describes a binder based on acrylated polyesters, which are obtained by polymerising an acrylate containing hydroxyl groups in a polyester or alkyd resin containing hydroxyl groups. Crosslinking may be performed with melamine resins and epoxy resins simultaneously.

DE-A-38 00 389 describes the modification of copolymers containing hydroxyl groups with lactones, in particular with epsilon-caprolactone.

U.S. Pat. No. 4,501,829 describes polyesters having hydroxyl and carboxyl groups, which are reacted with lactones. The reaction proceeds on the hydroxyl groups. U.S. Pat. No. 4,082,816 describes compositions of (meth) acrylic copolymers containing carboxyl groups and modified with caprolactone and melamine/formaldehyde resins.

The as yet unpublished German patent application P 42 37 658 describes binder compositions which are composed of lactone-modified polyacrylates or polyesters containing carboxyl groups and polymers containing glycidyl groups. Urethanisation of the acidic components is not mentioned.

Some of the stated coating compositions give rise to films having elevated hardness and good weathering resistance. They do not, however, fulfil the constantly rising requirements for elevated resistance to acids and solvents.

The object of the invention is to provide a binder system which may be processed to yield coating compositions which may be stored at elevated temperature to yield coatings having good hardness, good weathering resistance and elevated elasticity and which are additionally resistant to acids and solvents. The coating compositions should additionally exhibit good application characteristics (reduced tendency to sag) even at elevated layer thicknesses.

It has been found that this object may be achieved by a binder composition which is provided by this invention and contains:

A) 25 to 75 wt. % of the reaction product of one or more carboxy-functionalised (meth)acrylic copolymers containing urethane groups and/or of one or more carboxy-functionalised polyesters containing urethane groups, each having an acid value of 30 to 200 mg of KOH/g, with one or more lactones, B) 25 to 75 wt. % of one or more epoxy-functionalised crosslinking agents having at least two epoxy functions per molecule with a number average molecular weight (Mn) of 200 to 10000 g/mol, C) 0 to 60 wt. % of one or more polyols having at least two hydroxyl functions per molecule, $D_1$) 0 to 20 wt. % of one or more melamine resins, $D_2$) 0 to 40 wt. % of one or more free or capped polyisocyanates, wherein the sum of the weight percentages of components A), B), C), $D_1$) and $D_2$) amounts to 100 wt. %, together with E) 0 to 10 wt. % of one or more catalysts to catalyse the reaction of carboxyl and epoxy groups, relative to the sum of weights of components A) to $D_2$).

It has been found that the binder compositions according to the invention or the coating compositions produced therefrom give rise to coatings which have elevated solvent resistance, in particular towards xylene, even in the case of the purest possible crosslinking between carboxyl groups and epoxy groups, such that it is possible to work without or only with small quantities of additional crosslinking agents such as polyisocyanates and/or melamine resins.

According to a preferred embodiment of the invention, the carboxy-functionalised (meth)acrylic copolymers containing urethane groups, which may be reacted with lactone according to component A), have a number average molecular weight (Mn) of 1000 to 30000 g/mol. The carboxy-functionalised polyesters containing urethane groups which may correspondingly be used preferably have a calculated molecular weight of 500 to 4000 g/mol, for example of 800 to 4000 g/mol. The acid value of these starting materials is 30 to 200 mg of KOH/g, preferably from 30 to 140 mg of KOH/g and particularly preferably from 60 to 120 mg of KOH/g.

This invention also relates to coating compositions which may be produced from the binder compositions according to the invention. These may be aqueous and/or solvent-based coating compositions, which may optionally contain pigments, extenders and/or conventional lacquer auxiliary substances and additives; they may also be formulated as solvent-free and anhydrous powder coatings.

The carboxyl groups in component A) of the binder or coating compositions according to the invention are modified by reaction with lactones. Attaching the lactones "chain extends" the carboxyl groups. The carboxyl groups originally located on the (meth)acrylic copolymer skeleton and/or on the polyester skeleton are esterified by ring-opening of the lactone to be attached, wherein the lactone/carboxyl groups are, however, released, so yielding reaction products having exposed carboxyl groups on the short side chains corresponding to the lactone.

During the production of the (meth)acrylic copolymers or polyesters containing urethane and carboxyl groups and used to prepare component A), the carboxyl groups may be introduced directly by using structural units containing carboxyl groups, for example during synthesis of polymers, such as (meth)acrylic copolymers. Examples of suitable monomers containing carboxyl groups which may be used for this purpose are unsaturated carboxylic acids, such as for example acrylic, methacrylic, itaconic, crotonic, isocrotonic, aconitic, maleic and fumaric acid, semi-esters of maleic and fumaric acid together with beta-carboxyethyl acrylate and adducts of hydroxyalkyl esters of acrylic acid and/or methacrylic acid with carboxylic anhydrides, such as for example phthalic acid mono-2-methacryloyloxyethyl ester.

The term (meth)acrylic is used in the present description and the patent claims. This means acrylic and/or methacrylic.

It is, however, possible during production of the (meth) acrylic copolymers or polyesters containing urethane and carboxyl groups initially to synthesise a polymer containing hydroxyl and optionally carboxyl groups having an OH value of 30 to 200 mg of KOH/g and partially or entirely to introduce the carboxyl groups in a second stage by reacting the polymers containing hydroxyl and optionally carboxyl groups with carboxylic anhydrides. The quantity ratios used in this method must, however, be such that sufficient OH groups remain in order to be able to urethanise the (meth) acrylates.

Carboxylic anhydrides suitable for addition onto the polymers containing hydroxyl groups are the anhydrides of aliphatic, cycloaliphatic and aromatic saturated and/or unsaturated di- and polycarboxylic acids, such as for example the anhydrides of phthalic acid, tetrahydrophthalic acid, hexahydrophthalic acid, succinic acid, maleic acid, itaconic acid, glutaric acid, trimellitic acid and pyromellitic acid, together with the halogenated or alkylated derivatives thereof.

The anhydrides of phthalic acid, tetrahydro- and hexahydrophthalic acid together with 5-methylhexahydrophthalic anhydride are preferably used.

Examples of hydroxyalkyl esters of alpha,beta-unsaturated carboxylic acids containing primary hydroxyl groups suitable for the production of hydroxy-functional poly(meth)acrylates are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples of usable hydroxyalkyl esters containing a secondary hydroxyl group which may be mentioned are 2-hydroxypropyl acrylate, 2-hydroxybutyl acrylate, 3-hydroxybutyl acrylate and the corresponding methacrylates.

The hydroxy-functionalised component may advantageously at least partially be a reaction product prepared from one mol of hydroxyethyl acrylate and/or hydroxyethyl methacrylate and an average of 2 mol of epsilon-caprolactone.

A reaction product prepared from acrylic acid and/or methacrylic acid with the glycidyl ester of a carboxylic acid containing a tertiary alpha-carbon atom may also be used as at least a proportion of the hydroxy-functionalised component. Glycidyl esters of highly branched monocarboxylic acid are available, for example, under the trade name "Cardura". The reaction of the acrylic acid or methacrylic acid with the glycidyl ester of a carboxylic acid containing a tertiary alpha carbon may be performed before, during or after the polymerisation reaction.

In addition to the above-stated monomers, it is also possible to use further ethylenically unsaturated monomers in the production of the (meth)acrylic copolymers. Selection of the further ethylenically unsaturated monomers is not critical. Care must merely be taken to ensure that incorporation of these monomers does not give rise to undesirable copolymer properties.

Alkyl esters of acrylic and methacrylic acid are in particular suitable as a further ethylenically unsaturated component, such as for example methyl (meth)acrylate, ethyl (meth)acrylate, propyl (meth)acrylate, butyl (meth) acrylate, isopropyl (meth)acrylate, isobutyl (meth)acrylate, pentyl (meth)acrylate, hexyl (meth)acrylate, cyclohexyl (meth)acrylate, 2-ethylhexyl (meth)acrylate, octyl (meth) acrylate, 3,5,5-trimethylhexyl (meth)acrylate, decyl (meth) acrylate, dodecyl (meth)acrylate, hexadecyl (meth)acrylate, octadecyl (meth)acrylate and octadecenyl (meth)acrylate. It is also possible to use silane-modified monomers, such as for example gamma-methacryloxypropyl-trimethoxysilane or gamma-methacryloxypropyl-tris(2methoxyethoxy)silane.

Further ethylenically unsaturated monomers may be used instead of the above-stated acrylic and methacrylic acid alkyl esters or as well as these alkyl esters for the production of (meth)acrylic copolymers, wherein selection of these monomers is largely directed by the desired properties of the coating composition with regard to hardness, elasticity, compatibility and polarity.

Examples of further suitable ethylenically unsaturated monomers are the alkyl esters of maleic, fumaric, tetrahydrophthalic, crotonic, isocrotonic, vinylacetic and itaconic acid, such as for example the corresponding methyl, ethyl, propyl, butyl, isopropyl, isobutyl, pentyl, amyl, isoamyl, hexyl, cyclohexyl, 2-ethylhexyl, octyl, 3,5,5-trimethylhexyl, decyl, dodecyl, hexadecyl, octadecyl and octadecenyl esters.

Small proportions of monomers containing at least two polymerisable, olefinically unsaturated double bonds may also be used. The proportion of these monomers is preferably below 5 wt. %, relative to the total weight of the monomers.

Examples of such compounds are hexanediol diacrylate, hexanediol dimethacrylate, ethylene glycol diacrylate, ethylene glycol dimethacrylate, butanediol diacrylate, butanediol dimethacrylate, hexamethylenebismethacrylamide, trimethylolpropane triacrylate, trimethylolpropane trimethacrylate and similar compounds.

Monovinyl aromatic compounds are another suitable component. They preferably contain 8 to 9 carbon atoms per molecule. Examples of suitable compounds are styrene, vinyltoluene, alpha-methylstyrene, chlorostyrene, o-, m- or p-methylstyrene, 2,5-dimethylstyrene, p-methoxystyrene, p-tert.-butylstyrene, p-dimethylaminostyrene, p-acetamidostyrene and m-vinylphenol. Vinyltoluenes and in particular styrene are preferably used.

The monomers or the monomer mixture used may contain initiators. In the event that initiators are not present in the monomer mixture, they may be added to the monomer mixture optionally with a slight delay or separately apportioned. Polymerisation may then be continued for a relatively extended period, for example several hours. It is then possible to use a conventional lacquer solvent to establish a desired solids content, for example of the order of 30 to 60 wt. %, for example of 50 wt. %.

The binders are produced by free-radical copolymerisation. The quantity of monomer is adjusted in such a manner that the desired specifications with regard to molecular weight, OH group ratio, OH value and acid value are achieved. It may prove advantageous to add a proportion of the monomers with delay relative to the remainder.

Production proceeds, for example, by free-radical solution polymerisation in the presence of a free-radical initiator, as is familiar to the person skilled in the art. Examples of free-radical initiators are dialkyl peroxides, such as di-tert.-butyl peroxide, dicumyl peroxide; diacyl peroxides, such as dibenzoyl peroxide, dilauroyl peroxide; hydroperoxides, such as cumene hydroperoxide, tert.-butyl hydroperoxide; peresters, such as tert.-butyl perbenzoate, tert.-butyl perpivalate, tert.-butyl per-3,5,5-trimethylhexanoate, tert.-butyl per-2-ethylhexanoate; peroxydicarbonates, such as di-2-ethylhexyl peroxydicarbonate, dicyclohexyl peroxydicarbonate; perketals, such as 1,1-bis-(tert.-butylperoxy)-3,5, 5-trimethylcyclohexane, 1,1-bis-(tert.-butylperoxy) cyclohexane; ketone peroxides, such as cyclohexanone peroxide, methyl isobutyl ketone peroxide and azo compounds, such as 2,2'-azo-bis-cyclohexanecarbonitrile, azo-bis-isobutyronitrile, C—C cleaving initiators, such as for example benzopinacole derivatives.

The polymerisation initiators are generally used, for example, in a quantity of 0.1 to 4 wt. %, relative to the weight of monomers.

In order to urethanise the carboxy-functionalised (meth) acrylic copolymers, OH functions of the carboxy-functionalised (meth)acrylic copolymers must be reacted with mono-, di-, tri- or polyisocyanates in a further reaction stage. The quantity of the di-, tri- or polyisocyanates is dependent upon the OH value of the (meth)acrylic copolymer and must be selected such that gelation is avoided. For example, copolymers having an OH value of 30 to 100 mg of KOH/g are reacted with di-, tri- or polyisocyanate in such a manner that the resultant urethanised copolymer has an OH value of 15 to 80 mg of KOH/g. This procedure may be performed in such a manner that the carboxy- and OH-functional (meth)acrylic copolymer is initially introduced into a vessel dissolved in an aprotic solvent and the di-, tri- or polyisocyanate, optionally dissolved in an aprotic solvent such as for example xylene or butyl acetate, is then apportioned within a period of, for example 30 minutes to 3 hours at 5° C. to 80° C. The reaction is complete once the NCO value of the reaction mixture is less than 0.1. When monoisocyanates are used, it is not necessary to restrict the quantity of isocyanate as all the OH functions of the (meth) acrylic copolymer may optionally be reacted. The reaction conditions are the same as for di-, tri- or polyisocyanates. It is, of course, also possible to urethanise the OH-functional (meth)acrylic copolymers before the introduction of carboxyl groups by reaction with acid anhydrides and only thereafter to attach the acid. Examples of di-, tri- and polyisocyanates, which may also be used as a mixture, are described in the description of component $D_2$).

Examples of monoisocyanates are, for example, reaction products of the diisocyanates described for component $D_2$) with monoalcohols, such as methanol, butanol, hexanol or octanol, wherein 1 mol of diisocyanate is reacted with 1 mol of alcohol. Further examples of monoisocyanates are alpha, alpha-dimethyl-m-isopropenylbenzyl isocyanate or isocyanatoacrylate.

The polymers containing urethane and carboxyl groups used for the production of component A) are copolymers containing carboxyl groups and/or polyesters containing carboxyl groups. The polyesters containing carboxyl groups may be synthesised using conventional methods (c.f. for example B. Vollmert, *Grundriβ der makromolecularen Chemie*, E. Vollmert Verlag, Karlsruhe 1982, volume II, pp. 5 et seq.) from aliphatic and/or cycloaliphatic di-, tri- or more highly hydric alcohols, optionally together with monohydric alcohols and from aliphatic, aromatic and/or cycloaliphatic carboxylic acids together with polycarboxylic acids of greater basicity. Examples of suitable alcohols are ethylene glycol, 1,2-propanediol, 1,3-propanediol, 2,2-dimethyl-1,3-propanediol, 1,2-butanediol, 1,3-butanediol, 1,4-butanediol, 1,5pentanediol, 3-methyl-1,5-pentanediol, 1,6-hexanediol, 2-ethyl-1,6-hexanediol, 2,2,4-trimethyl-1,6-hexanediol, 1,4-dimethylolcyclohexane, glycerol, trimethylolethane, trimethylolpropane, pentaerythritol, etherification products of diols and polyols, for example di- and triethylene glycol, polyethylene glycol, neopentyl glycol esters of hydroxypivalic acid.

Examples of suitable carboxylic acids are adipic, azelaic, 1,3- and 1,4-cyclohexanedicarboxylic acid, tetrahydrophthalic, hexahydrophthalic, endomethyltetrahydrophthalic acid, isophthalic acid, o-phthalic acid, terephthalic acid or the anhydrides thereof and the esterifiable derivatives thereof.

The calculated molecular weights of the polyesters are, for example, from 500 to 4000 g/mol, preferably between 500 and 2000 g/mol.

The carboxy-functional (meth)acrylic copolymers and polyesters usable for the production of component A) are "chain extended" with a lactone. The lactones (cyclic ethers) attach themselves to carboxyl groups, wherein the ring is opened and a new terminal carboxyl group arises. Since, in the presence of OH and COOH groups, the OH groups react substantially faster with lactones, preferred carboxy-functional (meth)acrylic copolymers and carboxy-functional polyesters for the production of component A) are those which contain no OH groups. If copolymers or polyesters containing OH groups are used as starting materials, the OH groups thereof are preferably entirely or largely reacted with anhydrides to yield carboxylic acids. An example of a particularly preferred lactone is epsilon-caprolactone.

Examples of other lactones are gamma-butyrolactone and lactones, such as beta-propiolactone, delta-valerolactone, delta-butyrolactone, zeta-enantholactone, eta-caprolactone. Such lactones may be substituted; examples of substituted lactones are 6-methyl-epsilon-caprolactone, 3-methyl-epsilon-caprolactone, 5-methyl-epsilon-caprolactone, 5-phenol-epsilon-caprolactone, 4-methyl-delta-valerolactone, 3,5-dimethyl-epsilon-caprolactone and mixtures thereof.

The reaction with the lactone may, for example, proceed immediately after resin synthesis, i.e. after synthesis of the poly(meth)acrylic copolymer and/or of the polyester. The reaction proceeds, for example, at elevated temperature, for example at temperatures of up to 100° C. The reaction may, for example, be performed with stirring for, for example, up to 10 hours.

Like the carboxy-functionalised (meth)acrylic copolymers already described, the acidic polyesters are urethanised. The reaction conditions are the same as for the (meth)acrylic copolymers. It is possible to introduce urethane groups by 1) reacting the carboxy- and OH-functional polyester, by 2) reacting the lactone-modified carboxy-functional and OH-functional polyesters with mono-, di- or tri- or polyisocyanates. It is preferred to react carboxy- and OH-functional polyesters with polyisocyanates before lactonisation. In this manner, it is possible to urethanise a large proportion or the entirety of the OH groups, so that, in the event of reaction with lactone, these OH groups can no longer enter into competitive reactions with carboxyl groups.

It is also possible to introduce the urethane groups during the synthesis of the polyesters themselves. This is achieved by entirely or partially replacing di- or tricarboxylic acids with di- or triisocyanates.

Methods 1) and 2) above are preferred, with method 1) being particularly preferred. Examples of usable mono-, di-, tri- or polyisocyanates are stated in the description of component $D_2$).

The binder composition according to the invention, or the coating compositions according to the invention contain as component B) one or more epoxy-functionalised compounds containing at least two epoxy functions per molecule and having a number average molecular weight (Mn) of 200 to 10000 g/mol.

Examples of such compounds are conventional di- or polyepoxides, for example polyglycidyl ethers based on diethylene glycol, dipropylene glycol, polypropylene glycol having a number average molecular weight (Mn) of up to 2000, triglycidyl ethers of glycerol and/or di- or polyphenols such as bisphenol A.

Further examples of di- or polyepoxides are those based on di- or polyglycidyl esters. Examples of these are reaction products prepared from 1-hydroxy-2,3-epoxypropane with phthalic or terephthalic acid to yield phthalic or terephthalic acid bis(2,3-epoxypropyl ester) or of a diglycidyl ether of bisphenol A with trimellitic anhydride to yield polyesters having a number average molecular weight (Mn) of 500 to 2000.

Further examples which may also be used are glycidyl-functionalised (meth)acrylic copolymers. Examples of these are copolymers of glycidyl (meth)acrylate or 2,3-epoxy-cyclopentyl acrylate. Comonomers which may be selected are esters of (meth)acrylic acid, such as for example methyl, ethyl, butyl, isobutyl, ethylhexyl, cyclohexyl and/or lauryl (meth)acrylate, hydroxy-functionalised esters of (meth)acrylic acid, such as for example hydroxyethyl and/or hydroxypropyl ester, together with styrene, vinyltoluene and/or alpha-methylstyrene as well as all alpha,beta-unsaturated monomers as have already been described above for component A). The number average molecular weight (Mn) may, for example, be between 1000 and 10000, preferably from 2000 to 5000. Further copolymerisable glycidyl monomers are, for example, (meth)allylglycidyl ethers or 3,4-epoxy-1-vinylcyclohexane. The copolymers are produced by free-radical solution polymerisation, which is known to the person skilled in the art and requires no further explanation.

It is also possible at least partially to precondense binder components A and B in a further reaction stage. This may, for example, be achieved by heating components A and B together. The desired degree of condensation may, for example, be determined by the reduction in acid value. It is, for example, possible to heat the mixture to temperatures of for example 80° to 120° C. with stirring and to continue stirring until the acid value of the mixture has fallen by, for example, 2 to 5 mg of KOH/g of solid resin. It is, of course, also possible to reduce the acid value further, in which case care should be taken to ensure that the viscosity of the mixture does not increase as far as gelation. The storage stability of the compositions may be further increased by precondensation of components A) and B). Precondensation between components A) and C) is also possible and the conditions are the same as those for condensation of A) and B). It is also possible to synthesise binder B) as a graft on binder C) or vice versa.

To this end, it is, for example, possible initially to introduce part or all of the component C) polyol into a vessel, optionally with one or more organic solvents, and to react therein the monomers necessary for the production of the epoxy-functional component B) or a proportion thereof. For example, the polyols C), optionally with solvent, may be initially introduced into a vessel and heated, for example to temperatures of the order of 140° C. The monomers necessary for the production of the epoxy-functional component B), optionally together with initiators, may be apportioned, for example over a period of up to 5 hours. The polyol component C), as defined in greater detail below, used in this method is preferably a polyester polyol, in particular such a compound having a number average molecular weight Mn of 500 to 2000, preferably having an acid value of below 3 mg of KOH/g and preferably having an OH value of 15 to 200 mg of KOH/g. Such a precondensation product (graft copolymer) prepared from B) and C) may have advantages over a mixture of B) and C), such as for example better compatibility and more homogeneous mixing.

The binder composition according to the invention or the coating compositions according to the invention may contain one or more polyols containing at least two hydroxyl functions per molecule as component C). These polyols may, for example, be selected from among a) polyols from the group comprising linear or branched alkane di- and polyols having 2 to 12 carbon atoms, or b) poly(meth)acrylates or poly(meth)acrylamides containing hydroxyl groups and based on (meth)acrylic acid hydroxyalkyl esters having 2 to 12 carbon atoms in the alkyl portion or (meth)acrylic acid hydroxyalkylamides having 2 to 12 carbon atoms in the alkyl portion, optionally copolymerised with alpha,beta-unsaturated monomers having a number average molecular weight Mn of 1000 to 10000, or c) poly(meth)acrylates containing hydroxyl groups and based on (meth)acrylic acid hydroxyalkyl esters having 2 to 12 carbon atoms in the alkyl portion and optionally copolymerisable alpha,beta-unsaturated monomers, which are modified with cyclic esters of hydroxycarboxylic acid having 4 to 6 carbon atoms, with a number average molecular weight Mn of 1000 to 10000, or d) polyester polyols or polyether polyols, each having a number average molecular weight Mn of 500 to 2000.

Examples of group a) alkane di- and polyols are those having linear and branched chains with 2 to 12 carbon atoms. They contain at least two hydroxyl functions, but preferably at least three.

Examples of these substances are propanediol, butanediol, hexanediol, glycerol, trimethylolpropane and pentaerythritol.

Examples of poly(meth)acrylates b) containing hydroxyl groups and based on (meth)acrylic acid hydroxyalkyl esters having 2 to 12 carbon atoms in the alkyl portion are hydroxyalkyl esters of acrylic acid or methacrylic acid with alcohols having at least two hydroxyl groups, such as 1,4-butanediol mono(meth)acrylate, 1,6-hexanediol mono(meth) acrylate or 1,2,3-propanetriol mono(meth)acrylate. Examples of poly(meth)acrylamides b) containing hydroxyl groups and based on (meth)acrylic acid hydroxyalkylamides are amides of acrylic acid or methacrylic acid with hydroxyalkylamines or di(hydroxyalkyl)amines each having 2 to 12 carbon atoms in the alkyl portion, which may contain one or more hydroxyl groups, such as acrylic acid hydroxyethylamide.

The component b) poly(meth)acrylates containing hydroxyl groups may be homo- or copolymers. They have a number average molecular weight (Mn) of 1000 to 10000, preferably of 3000 to 6000 g/mol. Copolymerisable monomers for the production of the copolymers are alpha,β-unsaturated monomers, free-radically polymerisable monomers from the group comprising esters of alpha,beta-unsaturated carboxylic acids, such as acrylic acid or methacrylic acid, wherein methyl, ethyl, propyl alcohols and the isomers and higher homologues thereof are examples of the alcohol component. Further examples are diesters of maleic or fumaric acid, wherein the alcohol component is the same as mentioned above. Further examples are vinyl aromatic compounds, such as styrene, alpha-methylstyrene and vinyltoluene. Further examples are vinyl esters of short-chain carboxylic acids, such as vinyl acetate, vinyl propionate and vinyl butyrate.

The above-defined component c) poly(meth)acrylates containing hydroxyl groups may be modified poly(meth)acrylate homo- and copolymers, as are described in b), the hydroxyl groups of which may be entirely or partially reacted with cyclic esters, such as for example of hydroxycarboxylic acids having 4 to 6 carbon atoms, such as gamma-butyrolactone or epsilon-caprolactone. The resultant modified component c) poly(meth)acrylates have a number average molecular weight Mn of 1000 to 10000.

Examples of component d) polyester polyols or polyether polyols are those having a number average molecular weight Mn of 500 to 2000 g/mol. Specific examples are reaction products of di- or tricarboxylic acids, such as adipic acid or trimellitic acid, with polyols, wherein the polyols are present in excess. Further examples are reaction products of di- or triols, such as propanediol, butanediol or glycerol, with ethylene oxide or propylene oxide.

The binder composition according to the invention or the coating compositions according to the invention may optionally contain as component $D_1$) one or more melamine resins as crosslinking agents. Examples of these are water-insoluble butanol- or isobutanol-etherified melamines, such as for example the commercial products Setamin® US 138 or Maprenal® MF 610; co-etherified melamines, which are etherified with both butanol and methanol, such as for example Cymel® 254, together with hexamethyloxymethylmelamine (HMM melamines), such as for example Cymel® 301 or Cymel® 303, wherein an acid catalyst, such as for example p-toluenesulphonic acid, may be added to the latter for crosslinking. Further examples of melamine resin crosslinking agents are conventional hydrophilic and thus water-soluble or water-compatible melamine resins, such as for example methyl etherified melamines, such as for example Cymel® 325, Cymel® 327, Cymel® 350 and Cymel® 370, Maprenal® MF 927.

It is also possible to use the crosslinking agent tris (alkoxycarbonylamino)triazine. Examples of alkoxy groups are methoxy and butoxy groups.

The coating compositions according to the invention may contain as crosslinking agents (component $D_2$) one or more free or capped polyisocyanates. Examples of polyisocyanates which may be used are cycloaliphatic, aliphatic or aromatic polyisocyanates, such as tetramethylene diisocyanate, hexamethylene diisocyanate, 2,2,4-trimethylene diisocyanate, 1,12-dodecane diisocyanate, 1,3- and 1,4-cyclohexane diisocyanate, 1-isocyanato-3,3,5-trimethyl-5-isocyanatomethycyclohexane (=isophorone diisocyanate IPDI), perhydro-2,4'- and/or -4,4'-diphenylmethane diisocyanate, 1,3- and 1,4-phenylene diisocyanate, 2,4- and 2,6-tolylene diisocyanate, 2,4'- and/or 4,4'-diphenylmethane diisocyanate, 3,2'- and/or 3,4-diisocyanato-4-methyldiphenylmethane, 1,5-naphthylene diisocyanate, 4,4',4"-triphenylmethane triisocyanate, tetramethylxylylene diisocyanate or mixtures of these compounds.

In addition to these simple isocyanates, those containing heteroatoms in the isocyanate group linking residue are also suitable. Examples of these are polyisocyanates containing carbodiimide groups, allophanate groups, isocyanurate groups, urethane groups, acylated urea groups and biuret groups.

Known polyisocyanates which are principally used in the production of lacquers are particularly suitable for the invention, for example modification products of the above-stated simple polyisocyanates containing biuret, isocyanurate or urethane groups, in particular tris-(6-isocyanatohexyl) biuret or low molecular weight polyisocyanates containing urethane groups, as may be obtained by reacting excess IPDI with simple monohydric alcohols of the molecular weight range from 62 to 300, in particular with trimethylolpropane. Any desired mixtures of the stated polyisocyanates may, of course, be used for the production of the products according to the invention.

Suitable polyisocyanates are moreover known prepolymers having terminal isocyanate groups, as are in particular obtainable by reacting the above-stated simple polyisocyanates, especially diisocyanates, with substoichiometric quantities of organic compounds having at least two groups capable of reacting with isocyanate groups. The compounds used are preferably those having a total of at least two amino groups and/or hydroxyl groups and a number average molecular weight of 300 to 10000, preferably of 400 to 6000.

In these known prepolymers, the ratio of isocyanate groups to NCO-reactive hydrogen atoms is 1.05 to 10:1, preferably 1.1 to 3:1, wherein the hydrogen atoms preferably originate from hydroxyl groups.

The nature and quantity ratios of the starting materials used in the production of NCO prepolymers are moreover preferably selected such that the NCO prepolymers have a) an average NCO functionality of 2 to 4, preferably of 2 to 3 and b) a number average molecular weight of 500 to 10000, preferably of 800 to 4000.

The polyisocyanates may be used as free polyisocyanates. In this case, they are not capped. In this case, the systems are so-called two-component systems (2-pack systems), in which the polyisocyanates are added immediately before application. If the isocyanate groups of the polyisocyanates are completely capped, the capped polyisocyanates may then be added directly to the coating composition. In this case, the systems are so-called one-component systems (1-pack systems).

Conventional capping agents, as are for example used in the lacquer sector, may be used as the capping agent. Examples of usable capping agents are malonic acid dimethyl ester, malonic acid diethyl ester, acetoacetic acid ethyl ester, epsilon-caprolactam, acetanilide, acetylacetone, acetone oxime, substituted pyrazoles, such as dimethylpyrazole, 1,2-propanediol and/or butanone oxime, wherein the last stated capping agent is preferred.

The polyisocyanates may be capped, for example, by heating one or more polyisocyanates with the capping agent. For example, one or more polyisocyanates are initially introduced into a vessel and heated, for example to 80° C., while being stirred and the capping agent is apportioned (for example over approximately 10 minutes). Stirring is continued until the NCO value is less than 0.1%. It is also possible to cap one or more polyisocyanates with a mixture of two or more capping agents.

The advantage of using two or more different polyisocyanates and/or two or more different capping agents is that crosslinking may consequently be performed over a wide range of temperatures.

If uncapped, free polyisocyanates are used in aqueous systems, it may be advantageous to provide the polyisocyanates with hydrophilic or hydrophobic groups. The use of hydrophilic polyisocyanates facilitates their dispersion in water.

The introduction of hydrophobic groups accelerates the diffusion of the hydrophobised polyisocyanates into the resin particles in aqueous systems. Hydrophilised polyisocyanates are familiar to the person skilled in the art, for example from EP-A-0 019 844, EP-A-0 061 628, EP-A0 310 345 and EP-A-0 540 985. Hydrophobised polyisocyanates are described, for example, in the present applicant's unpublished German patent application P 43 17 791.

The binder composition according to the invention and thus the coating compositions according to the invention may contain one or more catalysts (component E). These are in particular catalysts soluble in organic solvents or water or miscible with organic materials. Examples of suitable catalysts soluble in organic solvents or miscible with organic materials are phosphonium salts, such as for example ethyltriphenylphosphonium acetate, phosphate, chloride, bromide, iodide, butyltriphenylphosphonium acetate, phosphate, chloride, bromide, iodide, benzyltriphenylphosphonium acetate, phosphate, chloride, bromide, iodide and quaternary ammonium salts, such as for example alkylbenzyldimethylammonium chloride, benzyltrimethylammonium chloride, methyltrioctylammonium chloride, tetraethylammonium bromide, N-dodecylpyridinium chloride and tetraethylammonium iodide. Preferred catalysts soluble in organic solvents or miscible with organic materials are ethyltriphenylphosphonium acetate, phosphate, chloride, bromide, butyltriphenylphosphonium acetate, phosphate, chloride, bromide, benzyltriphenylphosphonium acetate, phosphate, chloride, bromide and methyltrioctylammonium chloride. Ethyltriphenylphosphonium phosphate may, for example, be obtained from ethyltriphenylphosphonium acetate by reaction with phosphoric acid. Another example of a catalyst is p-toluenesulphonic acid. It also possible to react the glycidyl-functionalised resin with p-toluenesulphonic acid, for example at elevated temperatures of up to, for example, 80° C. In so doing, the p-toluenesulphonic acid is attached with oxirane opening. When the complete lacquer is stored, the attachment is cleaved to yield p-toluenesulphonic acid, which is capable of catalysing COOH-epoxide crosslinking.

Further examples are dinonylnaphthalenedisulphonic acid, dinonylnaphthalenemonosulphonic acid and dodecylbenzenesulphonic acid. The acid catalysts may be partially, entirely or more than neutralised. Possible neutralising agents are tertiary amines, such as for example triethylamine, dimethylethanolamine or dimethyloxazolidine.

The catalyst soluble in organic solvents and/or water or miscible with organic materials may be used in a quantity of approximately 0 to approximately 10 wt. %, preferably of 0.3 to 2.0 wt. %, relative to the sum of weights of components A) to $D_2$).

It is also possible to link an amine catalyst to the COOH-functionalised (meth)acrylic copolymer resin mixture. This is conveniently achieved by copolymerising tert.-amino (meth)acrylic monomers during synthesis of the COOH-functionalised (meth)acrylic copolymer resin.

Examples of such monomers are dimethylaminoethyl (meth)acrylate, diethylaminopropyl (meth)acrylate and dimethylaminopropyl (meth)acrylate. The proportion by quantity of these (meth)acrylates is from 0.5 to 10 wt. %, preferably from 1 to 5 wt. %, relative to the total solids content of the COOH-functionalised (meth)acrylic copolymer resin.

When preparing the binder or coating composition according to the invention, quantity ratios are preferably selected such that, between the component A) resin containing carboxyl groups and the epoxy component B), there is a molar ratio of the reactive groups of 1:3 to 3:1 and that, between the sum of the weights of components A) to C) and the weight of the component $D_1$) melamine resin or of the capped isocyanates $D_2$), there prevails a weight ratio of 65:35 wt. % to 98:2 wt. % or of 60:40 to 95:5 wt. % respectively. The binder compositions according to the invention may be used for the production of coating compositions. They may contain solvents, as are, for example, conventional for the production of coating compositions, for example lacquers. The solvents may also be those as are used during production of the individual components.

Examples of such solvents are organic solvents, such as aliphatic and aromatic hydrocarbons, for example toluene, xylene, mixtures of aliphatic and/or aromatic hydrocarbons, esters, ethers and alcohols. These are conventional lacquer solvents. Aqueous solutions may also be prepared in order to produce coating compositions from the binders according to the invention. Suitable emulsifiers, as are conventional in the lacquer sector, may optionally be used for this purpose.

The binder compositions according to the invention, together with the coating compositions according to the invention, may also be in aqueous form, wherein they contain no or only a small proportion of organic solvents. In order to produce aqueous compositions, it is, for example, possible largely to eliminate organic solvents from component A) containing carboxyl groups, for example by distillation, and then to neutralise a proportion of the carboxyl groups, for example with bases such as triethylamine or dimethylethanolamine and then to emulsify them in water, which is optionally heated. The other resins may then optionally be emulsified into this emulsifier resin. This is achieved, for example, by heating the emulsifier resin to 60°–80° C. and stirring in the hydroxy- and/or epoxy-functional resins, which have also been heated to 60°–80° C., within 5 to 120 minutes.

It is also possible to mix the COOH-functionalised resin, from which solvents have largely been removed, with the epoxy resin, from which the solvent has largely been removed, and to emulsify this in a water/emulsifier mixture using a rotor/stator unit. It is also possible to emulsify the components separately and to mix the emulsions.

In order to produce the coating compositions according to the invention, pigments, extenders and/or conventional lacquer auxiliary substances and additives may be added. These are conventional lacquer additives, as are usual in the lacquer sector.

Quantities are within the conventional ranges familiar to the person skilled in the art.

Examples of such additives are pigments, for example colouring pigments such as titanium dioxide or carbon black and effect pigments such as metal flake pigments and/or pearlescent pigments. The binder compositions prepared according to the invention are also suitable for coating compositions which contain such effect pigments. They preferably contain effect pigments together with colouring pigments or colouring pigments together with extenders. Further examples of additives are conventional lacquer extenders, such as for example talcum and silicates, together with auxiliary substances and additives such as plasticisers, light stabilisers, stabilisers and levelling agents, such as silicone oil. These are also used in conventional quantities familiar to the person skilled in the art.

The coating compositions produced from the binders according to the invention are suitable for coatings which adhere to many substrates, such as for example wood, textiles, plastics, glass, ceramics and in particular metal.

The coating composition according to the invention may be applied using known methods, such as for example spraying, dipping, roller or knife application. The topcoat lacquer coating is here applied onto the substrate, which has optionally already been provided with further lacquer layers. After a flashing off phase, the applied coating composition is crosslinked by heating. Storing temperatures are from 20° to 180° C., preferably from 60° to 150° C. The thickness of the stored film is approximately 15 to 60 μm. The resultant crosslinked lacquer coating is hard, glossy and acid-resistant.

A preferred embodiment is the application of the coating composition according to the invention as a clear lacquer coating on a base lacquer, preferably an aqueous base lacquer. The lacquer may be applied wet-on-wet or the base lacquer is previously dried by heating. In this case, particularly good adhesion of the two layers is achieved.

Base lacquers which may contain conventional topcoat lacquer pigments may, for example, be overpainted with the coating compositions according to the invention formulated without pigments as clear lacquers; the base lacquers preferably contain effect pigments, such as for example metallic pigments. The base lacquer binder is preferably based on polyester, polyurethane or (meth)acrylic copolymer resins. These binders may optionally be crosslinked with crosslinking agents, for example melamine or isocyanate derivatives.

Some examples of further base lacquers which may preferably be coated with pigment-free clear or pigmented topcoat lacquers prepared according to the invention are listed below.

Aqueous base lacquers based on 5 to 95 wt. % of an aqueous epoxy-functionalised emulsion polymer and 95 to 5 wt. % of an anionic polyurethane dispersion having an acid value of 5 to 10 mg of KOH/g. Suitable grinding resins for pigments and additives used in such aqueous base lacquer are in particular (meth)acrylic copolymer resins (for example in a quantity of up to 20 wt. %). Examples of such aqueous base lacquers are described in DE-A-36 28 124.

Base lacquers based on polyesters having a glass transition temperature of >30° C., melamine resins (for example partially butylated melamine resins), polyurea plasticisers (for example based on an addition product prepared from butylurethane and formaldehyde) and a copolymer prepared from polyethylene (85 wt. %) / vinyl acetate (15 wt. %) as a wax dispersion. Such base lacquers may contain conventional additives, such as cellulose acetobutyrate (for example having differing molecular weight ranges). Examples of such base lacquers are described in EP-A-187 379.

One example of solvent-based base lacquers, which are particularly suitable for repair purposes, contains physically drying binders based on thermoplastic polyester and/or (meth)acrylic resin mixed with cellulose ethers or cellulose esters and/or polyvinyl acetates. Self-curing (meth)acrylic resin binders containing colour pigments and having hydrogen atoms which react with isocyanate are also present, together with mixtures of cellulose esters and/or cellulose semi-esters dissolved in solvents. Such lacquers are described, for example, in DE-OS 29 24 632.

All the above-stated base lacquer formulations may contain conventional lacquer additives, together with conventional extenders and colouring pigments as well as metal pigments such as aluminium or stainless steel bronzes and other effect pigments.

Examples of base lacquers which may be coated with clear lacquers based on coating compositions according to the invention include powder coatings, as are described, for example in *Products Finishing*, April 1976, pages 54 to 56. It is also possible to heat the lacquer and apply it hot, for example at 60° to 100° C. In this manner, the lacquer may be applied at an elevated application solids content as heating reduces viscosity.

It is also possible to combine the lacquer with supercritical carbon dioxide as a lacquer solvent and to apply it using the so-called Unicarb process, as for example described in EP-A-0 321 607 and EP-A-0 388 927.

The coating compositions according to the invention may also be formulated as base lacquers and also as surfacers. They are then particularly well suited for the production of multi-layer lacquer coatings, for example in the automotive sector. Conventional additives, as were for example described above for base lacquers, may be added when preparing base lacquer or surfacer formulations.

In comparison with conventional base lacquers, the base lacquers according to the invention in particular give rise to coatings having improved resistance to warm, humid conditions.

The base lacquers according to the invention may be overpainted wet-on-wet, optionally after short preliminary drying, with conventional clear lacquers. They are preferably overpainted with clear lacquers based on the coating compositions according to the invention.

In the following examples, unless otherwise stated, parts and percentages relate to weight.

EXAMPLE 1)
Production of an epoxy-functional resin A 1250 parts of xylene are introduced into a 4 liter, three-necked flask equipped with a stirrer, thermometer, dropping funnel and reflux condenser and heated to reflux temperature (approx. 140° C.) while being stirred.

A mixture of
750 parts of glycidyl methacrylate
155 parts of styrene
195 parts of butyl acrylate
100 parts of butyl methacrylate and
50 parts of tert.-butyl perbenzoate is added dropwise within 5 hours and then post-polymerised for 6 hours.

The epoxy-functional resin has a solids content of 49.4% (1 hour, 150° C.).

For use in an aqueous clear lacquer (Example 7), the epoxy functional resin is evaporated under a vacuum to a solids content of 82.7%.

EXAMPLE 2)
Production of a polyester oligomer B 336.7 g of trimethylolpropane, 366.8 g of adipic acid and 297 g of hexanediol are melt-esterified with 5 g of hypophosphorous acid at 180° C. to 230° C. in a 2 liter, three-necked flask equipped with a stirrer, separator, thermometer and reflux condenser until an acid value of 20 is achieved.

The mixture is then condensed under a vacuum down to an acid value of less than 1.5.

The resultant product has a storing residue of 94.5% (1 h, 150° C.), a viscosity of 3200 mPa.s (100%), a hydroxyl value of 460 and a colour index of 30 Hazen.

EXAMPLE 3)
Production of a urethanised polyester oligomer C 850 parts of the polyester oligomer from Example 2) and 150 parts of isophorone diisocyanate are weighed out into a 4 liter, three-necked flask equipped with a stirrer, thermometer and reflux condenser and carefully heated to 80° C.

Once the exothermic reaction is complete, the NCO value of the resin is reduced to less than 0.1 at 80° C.

Once this NCO value is achieved, 250 parts of xylene are added.

The resultant product has a storing residue of 77.5% (1 hour, 150° C.), a viscosity of 3100 mPa.s, a hydroxyl value of 320 mg of KOH/g and a colour index of 25 Hazen.

EXAMPLE 4
Introduction of carboxyl groups into the urethanised polyester oligomer C from Example 3

Once the product in Example 3) has been produced, 878 parts of hexahydrophthalic anhydride are mixed in in a 4 liter, three-necked flask equipped with a stirrer, thermometer and reflux condenser and esterified to a constant acid value at 80° C.

The carboxy-functional resin has a storing residue of 88.3% (1 hour, 150° C.), a viscosity of 3800 mPa.s, an acid value of 320 mg of KOH/g (relative to solid resin) and a colour index of 25 Hazen.

EXAMPLE 5)
Chain extension with epsilon-caprolactone

In the apparatus from Example 4), 574 parts of epsilon-caprolactone are added dropwise within 30 minutes to 1000 parts of the carboxy-functional resin from Example 4. The reaction is performed at 140° C. until the theoretical solids content is reached.

The chain-extended carboxy-functional resin containing urethane groups has a solids content of 92.6% (1 hour, 150° C.), an acid value of 194 mg of KOH/g and a viscosity of 53000 mPa.s (25° C.).

EXAMPLE 6
Production of a clear lacquer composition

The following formulation is used for the preparation of a clear lacquer composition 38.8 parts of chain-extended carboxy-functional resin containing urethane groups from Example 5)

58.9 parts of epoxy-functional resin from Example 1)

2.3 parts of diethylene glycol monobutyl ether

The solids content of the clear lacquer composition is 65.0%.

Using a knife, the clear lacquer from Example 6) is applied to a dry film thickness of approximately 40 μm onto a glass sheet and, after 10 minutes' flashing off at room temperature, stored for 20 minutes at 140° C.

Pendulum hardness (König): 111 oscillations $H_2SO_4$ (10%, 65° C.): no marking after 20 minutes' exposure Appearance: glossy Xylene test: no marking or swelling after 10 minutes' exposure

EXAMPLE 7)
Production of an aqueous clear lacquer a) Production of an aqueous emulsion 128 parts of a 10% solution of an emulsifier based on a polyoxypropylene-polyoxyethylene sorbitan diester and 0.1 parts of a conventional commercial defoamer are introduced into a 1 liter flask at 60° C. The mixture is stirred with a stirrer rotating at a speed of approximately 8500 revolutions/minute. A mixture of 156 parts of carboxy-functional resin from Example 5) (solids content: 92.6%), 237 parts of epoxy-functional resin from Example 1) (solids content: 82.7%) and 23 parts of completely deionised water are added within 3 minutes at 60° C.

The resultant milky white emulsion has a solids content of 50.4%.

b) Aqueous clear lacquer composition 500 parts of emulsion from Example 7a 340 parts of completely deionised water The aqueous clear lacquer has a solids content of 30%. It is applied using a spray gun (1.3 mm nozzle) to a dry film thickness of approximately 40 μm onto bright iron sheet or onto an iron sheet coated with a multilayer lacquer coating comprising an electrocoated primer, surfacer and aqueous base lacquer and, after 20 minutes' flashing off (10 minutes at room temperature, 10 minutes at 80° C.), stored for 20 minutes at 140° C.

Properties of stored films:

on iron sheet:

pendulum hardness (König): 107 oscillations in layer structure:

pendulum hardness: 85 oscillations $H_2SO_4$ (10%, 65° C.): no marking after 20 minutes' exposure crosshatching test: rating 0–1 (very good to good)

xylene test: no marking or swelling after 10 minutes' exposure

We claim:

1. Binder composition suitable for coating compositions containing

A) 25 to 75 wt. % of the reaction product of one or more carboxy-functionalised (meth)acrylic copolymers containing urethane groups and/or of one or more carboxy-functionalised polyesters containing urethane groups, each having an acid value of 30 to 200 mg of KOH/g, with one or more lactones, B) 25 to 75 wt. % of one or more epoxy-functionalised crosslinking agents having at least two epoxy functions per molecule with a number average molecular weight (Mn) of 200 to 10000 g/mol, C) 0 to 60 wt. % of one or more polyols having at least two hydroxyl functions per molecule, $D_1$) 0 to 20 wt. % of one or more melamine resins, $D_2$) 0 to 40 wt. % of one or more free or capped polyisocyanates, wherein the sum of the weight percentages of components A), B), C), $D_1$) and $D_2$) amounts to 100 wt. %, together with E) 0 to 10 wt. % of one or more catalysts to catalyse the reaction of carboxyl and epoxy groups, relative to the sum of weights of components A) to $D_2$).

2. Binder composition according to claim 1, in which the carboxy-functionalised (meth)acrylic copolymers containing urethane groups have a number average molecular weight (Mn) of 500 to 10000 g/mol and the carboxy-functionalised polyesters containing urethane groups have a calculated molecular weight of 500 to 4000 g/mol.

3. Binder composition according to claim 1, in which the resins of components A) and B) are at least partially pre-condensed.

4. Binder composition according to claim 1, characterised in that component B) was entirely or partially produced in the presence of at least a proportion of component C).

5. Binder composition according to claim 4, characterised in that component C) is a hydroxy-functional polyester.

6. Coating composition containing the binder composition according to claim 1.

7. Coating composition according to claim 6 in the form of a lacquer containing solvent.

8. Coating composition according to claim 7 having a solvent content of 2 to 60 wt. %.

9. Coating composition according to claim 6 which contains water and optionally one or more organic solvents.

10. Coating composition according to claim 6 in the form of a powder coating.

11. Coating composition according to claim 6 in the form of a pigment-free and extender-free clear lacquer optionally containing conventional lacquer auxiliary substances and additives.

12. Coating composition according to claim 6 in the form of a topcoat or base lacquer containing pigments, extenders and/or conventional lacquer auxiliary substances and additives.

13. Process for the production of a coating composition characterised in that, optionally after partial neutralisation of the carboxyl groups present, a binder composition according to claim 1 is dissolved or dispersed in one or more organic solvents and/or water and, before or after dissolution or dispersion, is combined with conventional lacquer auxiliary substances and additives, pigments and/or extenders.

14. Process for using coating compositions according to claim 6 in pigmented forth for the production of single or multi-layer lacquer coatings.

15. Process for using coating compositions according to claim 11 in pigment-free form for the production of clear lacquer layers.

16. Process for using coating compositions according to claim 6 in pigmented form for the production of base lacquer layers.

17. Process for using coating compositions according to claim 6 for the production of surfacer layers and/or base lacquer layers and/or clear lacquer layers in multi-layer lacquer coatings.

18. Process for using coating compositions according to claim 6 for the production of multi-layer lacquer coatings in the automotive sector.

* * * * *

UNITED STATES PATENT AND TRADEMARK OFFICE
CERTIFICATE OF CORRECTION

PATENT NO. : 5,739,216

DATED : April 14, 1998

INVENTOR(S) : DUECOFFRE et al

It is certified that error appears in the above-identified patent and that said Letters Patent is hereby corrected as shown below:

Column 1, line 11, change "storing" to --stoving--;

line 19, change "alkylhexahydroxphthalic" to --alkylhexahydrophthalic--; and line 47, change "stored" to --stoved--.

Column 5, line 67, change "ethers" to --esters--.

Column 11, line 16, change "stored" to --stoved--.

Column 12, line 52, change "Storing" to --Stoving--; and line 54, change "stored" to --stoved--.

Column 14, line 29, change "storing" to --stoving--;

line 42, change "storing" to --stoving--; and line 53, change "storing" to --stoving--.

UNITED STATES PATENT AND TRADEMARK OFFICE
CERTIFICATE OF CORRECTION

PATENT NO. : 5,739,216
DATED : April 14, 1998
INVENTOR(S) : DUECOFFRE et al

It is certified that error appears in the above-identified patent and that said Letters Patent is hereby corrected as shown below:

Column 15, line 14, change "stored" to --stoved--;

line 47, change "stored" to --stoved--; and line 49, change "stored" to --stoved--.

Column 16, line 52, change "forth" to --form--.

Signed and Sealed this

Twenty-ninth Day of September, 1998

Attest:

BRUCE LEHMAN

*Attesting Officer*   *Commissioner of Patents and Trademarks*